US010161614B2

(12) United States Patent
Creusen et al.

(10) Patent No.: US 10,161,614 B2
(45) Date of Patent: Dec. 25, 2018

(54) RETROFIT LAMP FOR AUTOMOTIVE HEADLIGHTS

(71) Applicant: KONINKLIJKE PHILIPS N.V., Eindhoven (NL)

(72) Inventors: Martinus Petrus Creusen, Wijlre (NL); Lukas Kuepper, Aachen (DE); Ludovicus Johannes Lambertus Haenen, Sint Oedenrode (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 15/324,900

(22) PCT Filed: Jul. 3, 2015

(86) PCT No.: PCT/EP2015/065168
§ 371 (c)(1),
(2) Date: Jan. 9, 2017

(87) PCT Pub. No.: WO2016/008738
PCT Pub. Date: Jan. 21, 2016

(65) Prior Publication Data
US 2017/0198875 A1 Jul. 13, 2017

(30) Foreign Application Priority Data

Jul. 15, 2014 (EP) .................... 14176996

(51) Int. Cl.
*F21K 9/23* (2016.01)
*F21V 23/06* (2006.01)
(Continued)

(52) U.S. Cl.
CPC ............. *F21V 23/06* (2013.01); *B60Q 1/04* (2013.01); *F21K 9/23* (2016.08); *F21S 41/147* (2018.01);
(Continued)

(58) Field of Classification Search
CPC .. F21S 48/328; F21S 48/1159; F21S 48/1109; F21S 48/1317; F21S 41/147;
(Continued)

(56) References Cited

U.S. PATENT DOCUMENTS

2003/0227774 A1\* 12/2003 Martin ................ F21S 48/1159
362/240
2007/0258237 A1\* 11/2007 Hohl-AbiChedid .... F21V 29/80
362/216
(Continued)

FOREIGN PATENT DOCUMENTS

DE 102010012137 A1 3/2011
JP 2011066307 A 3/2011
(Continued)

OTHER PUBLICATIONS

EPO as ISA, "International Search Report and Written Opinion" dated Oct. 1, 2015 from International Application No. PCT/EP2015/065168, filed Jul. 3, 2015, 12 pages.
(Continued)

*Primary Examiner* — Anh T Mai
*Assistant Examiner* — Fatima N Farokhrooz
(74) *Attorney, Agent, or Firm* — Brian D. Ogonowsky; Patent Law Group LLP

(57) ABSTRACT

A retrofit lamp (310) is provided. The retrofit lamp comprises a connector (311) for mounting the lamp at an automotive headlight; a body (312) extending from the connector along an axis (313); and a plurality of light emitting diodes (314) arranged at the body. The light emitting diodes are arranged along the axis and adapted to emit light (331, 332) laterally with respect to the axis. The retrofit lamp further comprises a reflective element (315) arranged at an end of the arrangement of light emitting diodes opposite to the connector. The reflective element is adapted
(Continued)

to reflect some light (332) emitted by the light emitting diodes. Additionally—the extension of the arrangement of light emitting diodes along the axis is shorter than a light emitting area (114) of a reference replaceable headlight bulb (110), and—the reflective element (315) is configured to establish a virtual prolongation (340) of the arrangement of LEDs.

13 Claims, 4 Drawing Sheets

(51) Int. Cl.
| | | |
|---|---|---|
| B60Q 1/04 | (2006.01) | |
| F21S 41/19 | (2018.01) | |
| F21S 41/147 | (2018.01) | |
| F21S 41/32 | (2018.01) | |
| F21V 7/00 | (2006.01) | |
| F21Y 103/10 | (2016.01) | |
| F21Y 115/10 | (2016.01) | |
| F21S 45/47 | (2018.01) | |

(52) U.S. Cl.
CPC ............. *F21S 41/192* (2018.01); *F21S 41/32* (2018.01); *F21S 45/47* (2018.01); *F21V 7/005* (2013.01); *F21Y 2103/10* (2016.08); *F21Y 2115/10* (2016.08); *Y02B 20/383* (2013.01)

(58) Field of Classification Search
CPC .......... F21S 41/192; F21S 41/32; F21S 43/14; F21S 41/19; F21S 45/10; F21S 45/47; F21S 41/141; F21V 23/06; F21V 7/005; F21Y 2103/10; F21Y 2115/10; F21Y 2107/90; F21W 2102/00; Y02B 20/383; F21K 9/23; F21K 9/232; B60Q 1/04
See application file for complete search history.

(56) References Cited

U.S. PATENT DOCUMENTS

| | | | |
|---|---|---|---|
| 2010/0213809 A1* | 8/2010 | Roehl | F21K 9/232 313/46 |
| 2010/0309676 A1* | 12/2010 | Lin | F21S 41/147 362/517 |
| 2013/0113358 A1* | 5/2013 | Progl | F21V 29/004 313/46 |
| 2013/0271981 A1 | 10/2013 | Hussell et al. | |
| 2014/0022782 A1 | 1/2014 | Tessnow et al. | |
| 2016/0319999 A1* | 11/2016 | Elzinga | F21S 45/40 |

FOREIGN PATENT DOCUMENTS

| | | |
|---|---|---|
| WO | 2005055328 A1 | 6/2005 |
| WO | 2007005003 A1 | 1/2007 |
| WO | 2009036655 A1 | 5/2009 |
| WO | 2012147024 A | 11/2012 |

OTHER PUBLICATIONS

Extended European Search Report dated Jan. 20, 2015, European Application No. 14176996.8, 6 pages.

* cited by examiner

RETROFIT LAMP FOR AUTOMOTIVE HEADLIGHTS

CROSS-REFERENCE TO RELATED APPLICATIONS

The present application is a § 371 application of International Application No. PCT/EP2015/065168 filed on Jul. 3, 2015 and entitled "RETROFIT LAMP FOR AUTOMOTIVE HEADLIGHTS," which claims the benefit of European Patent Application No. 14176996.8 filed on Jul. 15, 2014. International Application No. PCT/EP2015/065168 and European Patent Application No. 14176996.8 are incorporated herein.

FIELD OF THE INVENTION

The present invention generally relates to the field of retrofit lamps employing light emitting diodes as light sources. In particular, the present invention relates to retrofit lamps for use in automotive headlights.

BACKGROUND OF THE INVENTION

Different types of replaceable bulbs are commonly used as light sources in automotive headlights. As in many other applications, lamps employing light emitting diodes (LEDs) as light sources have been introduced for replacing the more traditional light sources.

Automotive headlight applications are typically associated with regulations on the provided light output and/or the lifetime of the light sources employed. A goal for the design of a LED-based lamp for automotive headlight applications may for example be to provide a light output resembling the light output of a replaceable headlight bulb which the LED-based lamp is to replace. The need to obtain a desired light output and/or a desired lifetime imposes restrictions on the design of LED-based lamps intended for automotive headlight applications. Other factors which may influence the design of LED-based lamps may for example include energy efficiency, reliability and/or cost efficiency.

JP 2011066307 A discloses a light emitting device provided with a connector, a columnar element, axially extending from the connector and provided with LEDs, and a reflective element. The reflective element prevents the light from exiting the device directly in the axial direction.

WO 2007/005003 A1 discloses a light emitting device with a columnar element, axially extending and provided with LEDs, and a transverse reflector.

SUMMARY OF THE INVENTION

It would be advantageous to provide a retrofit lamp addressing one or more of the above mentioned concerns. In particular, it would be desirable to provide a retrofit lamp with reduced manufacturing costs.

To better address one or more of these concerns, a retrofit lamp having the features defined in the independent claim is provided. Preferable embodiments are defined in the dependent claims.

Hence, according to a first aspect, a retrofit lamp is provided. The retrofit lamp comprises a connector for mounting the lamp at an automotive headlight; a body extending from the connector along an axis; and a plurality of light emitting diodes arranged at the body. The light emitting diodes are arranged along the axis and adapted to emit light laterally with respect to the axis. The retrofit lamp further comprises a reflective element arranged at an end of the arrangement of light emitting diodes opposite to the connector. The reflective element is adapted to reflect some light emitted by the light emitting diodes.

Light emitted by an automotive headlight is typically employed to illuminate the surroundings of a vehicle, and in particular to provide illumination in a certain direction, e.g. to illuminate a road ahead of the vehicle. When the retrofit lamp is mounted at an automotive headlight, light emitted by the light emitting diodes (LEDs) may preferably contribute to the illumination provided by the automotive headlight. Although a LED may emit most of its light in a principal direction, e.g. laterally with respect to the axis of the retrofit lamp (if the lamp is mounted to illuminate in that direction), it typically emits light in a range of directions. Therefore, some light emitted by the LEDs may be emitted in directions which do not contribute to the desired headlight illumination. For example, some of the light emitted by the LEDs may leave the automotive headlight without being reflected by an automotive headlight reflector arranged to direct light towards the road ahead of the vehicle and may for example not contribute to the illumination of the road.

Arranging the reflective element at an end of the arrangement of LEDs opposite to the connector allows at least some light emitted by the LEDs in a direction away from the connector, e.g. light which would not contribute to the desired headlight illumination, to be reflected by the reflective element to other parts or portions of the automotive headlight such that the reflected light may contribute to the desired headlight illumination. Arranging the reflective element at an end of the arrangement of LEDs opposite to the connector therefore allows the light emitted by the LEDs to be more efficiently utilized by the retrofit lamp and/or by an automotive headlight at which the retrofit lamp may be mounted, and the required number of LEDs and/or the required light output of the individual LEDs employed for providing a given headlight illumination, may be reduced. A reduction of the required number of LEDs allows for a reduction of the manufacturing cost of the retrofit lamp. A reduction of the required light output of the individual LEDs may also reduce the manufacturing cost of the retrofit lamp as less advanced and/or less specialized LEDs may be employed.

The cost of the LEDs may correspond to a significant portion of the manufacturing cost of the retrofit lamp, in particular as LEDs with relatively high light output, and/or which are durable to operation at relatively high temperatures, may be required for the retrofit lamp to comply with operating conditions and/or regulations associated with automotive headlights. A reduction of the number of LEDs and/or of the light output of the individual LEDs may therefore significantly reduce the manufacturing cost of the retrofit lamp.

The connector may for example be adapted for mounting the lamp at an automotive headlight reflector, or at an automotive headlight employing one more lenses to redirect light emitted by the LEDs to provide a desired illumination.

By the LEDs being arranged along the axis is meant that the LEDs are arranged at positions distributed along the axis. The plurality of LEDs may form an arrangement of LEDs starting at a first position along the axis where the LED closest to the connector is arranged, and ending at a second position along the axis where the LED furthest away from the connector is arranged.

By the reflective element being arranged at an end of the arrangement of LEDs opposite to the connector is meant that the reflective element is arranged in proximity to the LED located furthest away from the connector along the axis. The reflective element may for example be arranged on the far side of the LED furthest away from the connector along the axis. The reflective element may for example be arranged adjacent to or close to the LED furthest away from the connector along the axis.

By the LEDs being adapted to emit light laterally with respect to the axis is meant that the LEDs are oriented such that they may emit light in directions transverse to, e.g. including a direction perpendicular to, the axis.

In at least some embodiments, the light emitting diodes may for example have a surface brightness of at least 30 Cd/cm2.

According to an embodiment, the light emitting diodes may be arranged in a row along the axis, which provides a light output better resembling the light output provided by a light emitting area, e.g. a filament, in a replaceable headlight bulb. Since some light emitting areas, e.g. filaments, may emit light with the same intensity in all directions around an axis, two or more rows of LEDs may for example be employed in the retrofit lamp, wherein the rows may be angularly distributed around the axis of the retrofit lamp to provide a light output better resembling the light output provided by the light emitting area.

In embodiments where the LEDs are arranged in a row along the axis, the reflective element may for example be arranged at an end of the row of LEDs opposite to the connector.

According to an embodiment, the reflective element may have a reflective surface which is transverse to the axis, which allows light emitted by the LEDs in a direction away from the connector to be more efficiently reflected by the reflective element, and may allow the retrofit lamp to more efficiently employ the light emitted by the LEDs. The reflective surface may for example be flat or curved. The reflective surface may for example be perpendicular to the axis of the retrofit lamp or may form an angle, e.g. of 70-110 degrees, relative to the axis. The reflective element may for example comprise additional reflective surfaces, and/or the lamp may for example comprise additional reflective elements.

According to an embodiment, the reflective element may extend in a direction transverse to the axis by at least half the extension of the arrangement of light emitting diodes along the axis, i.e. the LEDs arranged along the axis may be distributed along a portion of the axis extending by at most twice the height (i.e. the length along a direction transverse to the axis) of the reflective element. The present embodiment defines a size of the reflective element facilitating reflection of light emitted by the LEDs.

In embodiments where the LEDs are arranged in a row along the axis, the reflective element may for example extend in a direction transverse to the axis by at least half the length of the row of LEDs.

The reflective element may for example have a reflective surface which extends in a direction transverse to the axis with a length which is at least half the extension of the arrangement of LEDs along the axis.

According to an embodiment, the reflective element may extend in a direction transverse to the axis by at most twice the extension of the arrangement of light emitting diodes along the axis, i.e. the LEDs arranged along the axis may be distributed along a portion of the axis extending by at least half the height (i.e. the length along a direction transverse to the axis) of the reflective element. It will be appreciated that the size of the reflective element may be reduced since the reflective element is arranged at an end of the arrangement of LEDs.

In embodiments where the LEDs are arranged in a row along the axis, the reflective element may for example extend in a direction transverse to the axis by at most twice the length of the row of LEDs.

According to an embodiment, the reflective element may be arranged in thermal contact, e.g. in good thermal contact, with at least one of the light emitting diodes, e.g. with all of the light emitting diodes. Arranging the reflective element in thermal contact with at least one of the LEDs may allow the reflective element to function as a heat sink to the at least one LED, e.g. in combination with one or more additional heat sinks. Thus, the reflective element may be used for dissipating away heat generated by the at least one LED. The reflective element may for example be arranged in thermal contact with the at least one LED via the body of the retrofit lamp.

Arranging the reflective element in thermal contact with at least one of the LEDs may extend the lifetime of the at least one LED. The room available for arranging external heat sinks for the LEDs may be restricted and the use of the reflective element as a heat sink may reduce the need for external heat sinks.

According to an embodiment, the connector may comprise a portion mountable in a tangent plane of a reflector when the lamp is mounted at the automotive headlight. A distance from the portion, along the axis, to a light emitting diode of the plurality of light emitting diodes arranged closest to the portion, may coincide with a distance from a corresponding portion of a connector in a reference replaceable headlight bulb (which connector is used for mounting the reference replaceable headlight bulb at an automotive headlight reflector) to a light emitting area, e.g. a filament, of the reference replaceable headlight bulb. In other words, the arrangement of LEDs may be arranged at a distance from the portion of the connector of the retrofit lamp coinciding with a distance from a corresponding portion of a connector of a reference replaceable headlight bulb to a light emitting area of the reference replaceable headlight bulb.

With the present embodiment, when the retrofit lamp is mounted at an automotive headlight, the arrangement of LEDs begins at a position along the axis corresponding to that of a light emitting area of the reference replaceable headlight bulb, and the light output of the retrofit lamp may better resemble the light output provided by the light emitting area of the reference replaceable headlight bulb.

By the portion being mountable in a tangent plane of a reflector when the lamp is mounted at the automotive headlight is meant that the portion is adapted to be arranged in a tangent plane of a reflector when the lamp is mounted at the automotive headlight.

According to an embodiment of the invention, the extension of the arrangement of light emitting diodes along the axis may be shorter than a light emitting area, e.g. a filament, of a reference replaceable headlight bulb.

As described above, the reflective element allows the retrofit lamp to more efficiently employ the light emitted by the LEDs, and may allow the number of LEDs to be reduced. Light reflected by the reflective element, which light would otherwise not have contributed to the desired headlight illumination, allows the arrangement of LEDs to be shortened as compared to an arrangement without the reflective element. The reflective element may create the impression of a longer arrangement of LEDs and the light output of an automotive headlight in which the retrofit lamp is arranged may resemble the light output of an automotive headlight in which a reference replaceable headlight bulb is arranged, even if the light emitting area of the reference replaceable headlight bulb is in fact longer than the extension of the arrangement of LEDs along the axis.

As a result, the manufacturing costs may be reduced due to a reduced number of LEDs employed. With the present embodiment, a more compact solution is provided wherein space is saved due to the use of a shorter arrangement of LEDs.

In some embodiments, the arrangement of LEDs may be arranged at a distance from a portion of the connector coinciding with a distance from a corresponding portion of a connector of a reference replaceable headlight bulb to a specific light emitting area of the reference replaceable headlight bulb, e.g. a high beam light emitting area or a low beam light emitting area. In such embodiments, the arrangement of LEDs along the axis of the retrofit lamp may be shorter than such a specific light emitting area of the reference replaceable headlight bulb.

In embodiments where the LEDs are arranged in a row, the row of LEDs may for example be shorter than a light emitting area of the reference replaceable headlight bulb.

According to an embodiment, the arrangement of light emitting diodes may extend along the axis by less than three fourths of a length of the light emitting area of the reference replaceable headlight bulb.

In some embodiments, the arrangement of LEDs may be arranged at a distance from a portion of the connector coinciding with a distance from a corresponding portion of a connector of a reference replaceable headlight bulb to a specific light emitting area of the reference replaceable headlight bulb, e.g. a high beam light emitting area or a low beam light emitting area. In such embodiments, the arrangement of LEDs along the axis of the retrofit lamp may be shorter than three fourths of that specific light emitting area of the reference replaceable headlight bulb.

In embodiments where the LEDs are arranged in a row, the row of LEDs may for example be shorter than three fourths of a light emitting area of the reference replaceable headlight bulb.

According to an embodiment, the arrangement of light emitting diodes may extend along the axis by at least half of a length of a light emitting area of the reference replaceable headlight bulb. The arrangement of light emitting diodes along the axis may for example extend along the axis by at least half of a length of a high beam light emitting area or a low beam light emitting area of the reference replaceable headlight bulb.

According to an embodiment, the reference replaceable headlight bulb may be: a H1, H7, H8, H9, H11, H13, H15 or H17 replaceable headlight bulb; a H4 two-filament replaceable headlight bulb; a HIR2 replaceable headlight bulb; a S2 two-filament incandescent headlight bulb; a HS1 two-filament replaceable headlight bulb; a HS5 two-filament replaceable headlight bulb; 9002, 9003, 9004, 9005, 9006, or 9007 replaceable headlight bulb; or a D1, D2, D3, D4, D5, D6, D7 or D8 gas discharge headlight bulb.

According to an embodiment, the connector may comprise a portion mountable in a tangent plane of a reflector when the lamp is mounted at the automotive headlight. The reflective element may be arranged at a distance from the portion along the axis. The distance from the portion along the axis may be smaller than: a distance from a corresponding portion of a connector of a reference two-filament replaceable headlight bulb (which connector is adapted for mounting the reference two-filament replaceable headlight bulb at an automotive headlight reflector) to a far end of a high beam light emitting area of the reference two-filament replaceable headlight bulb; or a distance from a corresponding portion of a connector of a reference single-filament replaceable headlight bulb (which connector is adapted for mounting the reference single-filament replaceable headlight bulb at an automotive headlight reflector) to a far end of a light emitting area of the reference single-filament replaceable headlight bulb.

By a far end of a given light emitting area of a reference replaceable headlight bulb is meant the end or extremity of the given light emitting area located furthest away from the connector of the reference replaceable headlight bulb.

The reference single-filament replaceable headlight bulb may be e.g. a H7 replaceable headlight bulb. The reference two-filament replaceable headlight bulb may be e.g. a H4 replaceable headlight bulb.

As the reflective element is arranged at an end of the arrangement of the LEDs opposite to the connector (i.e. at the far end of the arrangement of LEDs relative to the connector), a distance from the far end of the arrangement of LEDs to the portion of the connector of the retrofit lamp is, in the present embodiment, shorter than a distance from a corresponding portion of a connector in the reference single- or two-filament replaceable headlight bulb to a far end of the respective light emitting area in the reference single- or two-filament replaceable headlight bulb.

As described above, the reflective element may create the impression of a longer arrangement of LEDs and the light output of an automotive headlight in which the retrofit lamp is arranged may resemble the light output of an automotive headlight in which a reference replaceable headlight bulb is arranged, even if the light emitting area of the reference replaceable headlight bulb extends further away from the connector of the reference replaceable headlight bulb than the distance along which the arrangement of LEDs extends from the connector of the retrofit lamp.

According to an embodiment, the lamp may be mountable at an automotive headlight for: a H1, H7, H8, H9, H11, H13, H15 or H17 replaceable headlight bulb; a H4 two-filament replaceable headlight bulb; a HIR2 replaceable headlight bulb; a S2 two-filament incandescent headlight bulb; a HS1 two-filament replaceable headlight bulb; a HS5 two-filament replaceable headlight bulb; 9002, 9003, 9004, 9005, 9006, or 9007 replaceable headlight bulb; or a D1, D2, D3, D4, D5, D6, D7 or D8 gas discharge headlight bulb.

According to a second aspect, there is provided an automotive headlight comprising an automotive headlight reflector; and a retrofit lamp as defined in any of the above described embodiments. The retrofit lamp may be mounted at the reflector and the reflector may be adapted to reflect some light emitted by the light emitting diodes. The automotive headlight reflector according to the second aspect may generally share the same advantages as the retrofit lamp according to the first aspect.

It is noted that embodiments of the invention relates to all possible combinations of features recited in the claims.

BRIEF DESCRIPTION OF THE DRAWINGS

These and other aspects will now be described in more detail with reference to the appended drawings showing embodiments.

All the figures are schematic, not necessarily to scale, and generally only show parts which are necessary in order to elucidate the embodiments, wherein other parts may be omitted or merely suggested. Like reference numerals refer to corresponding elements throughout the description.

DETAILED DESCRIPTION

The present aspects will now be described more fully hereinafter with reference to the accompanying drawings, in which currently preferred embodiments are shown. This invention may, however, be embodied in many different forms and should not be construed as limited to the embodiments set forth herein; rather, these embodiments are provided for thoroughness and completeness, and fully convey the scope of the present aspects to the skilled person.

Figure 1:
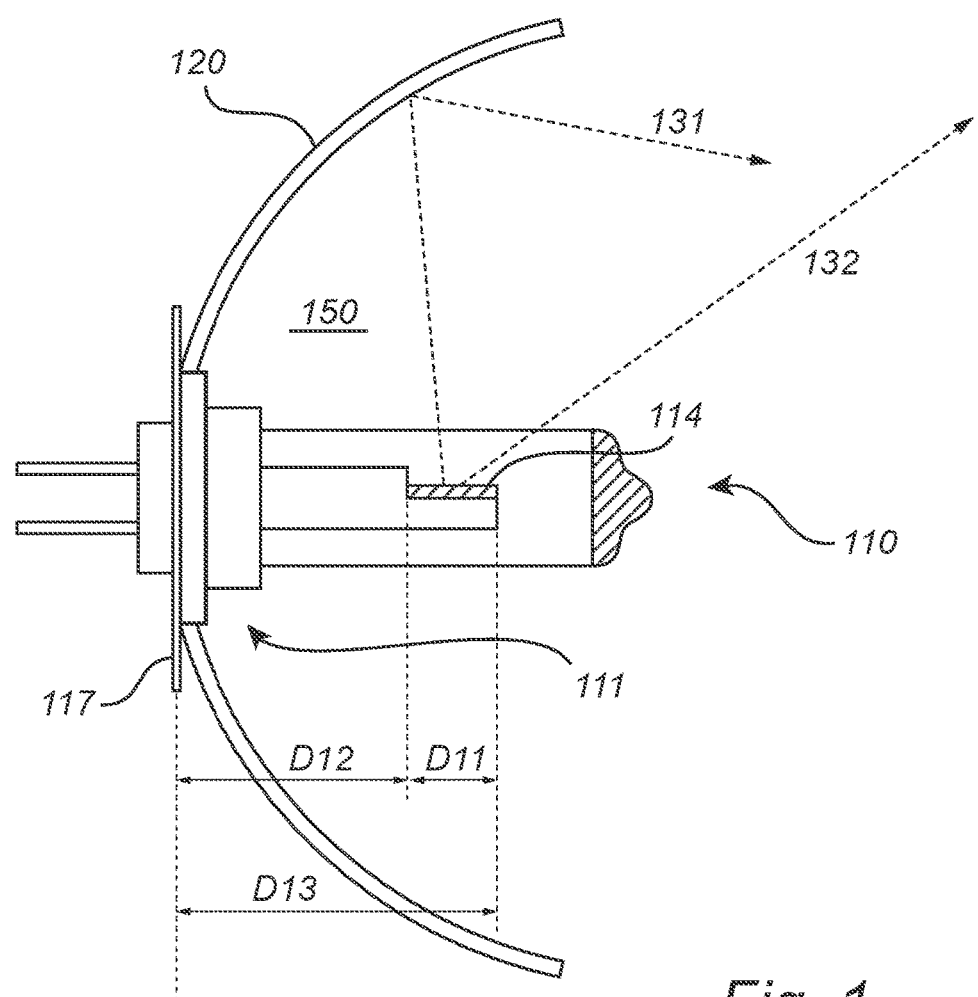
FIG. 1 is a schematic side view of an H7 replaceable headlight bulb mounted at an automotive headlight reflector.

FIG. 1 is a schematic side view of an H7 replaceable headlight bulb 110 mounted at an automotive headlight reflector 120 using a connector 111. The reflector 120 has a concave shape, e.g. a parabolic shape, facing an interior volume 150. The connector 111 of the H7 bulb 110 is mounted through a hole in the reflector 120 and the H7 bulb 110 extends from the connector 111 into the interior volume 150 such that a light emitting area 114, or filament, of the H7 bulb 110 is located in the interior volume 150. The light emitting area 114 of the H7 bulb 110 emits light 131 and 132 into the interior volume 150. The light emitting area 114 may for example extend in a horizontal direction when a vehicle in which the H7 bulb 110 is mounted is in a horizontal position.

The reflector 120 partially encloses the interior volume 150 where the light emitting area 114 of the H7 bulb 110 is located, but the reflector 120 is open at a side opposite to where the connector 111 is mounted, allowing light to exit the interior volume 150. The reflector 120 may for example be part of an automotive headlight arranged at the front of a vehicle and adapted to illuminate a road ahead of the vehicle. The concave shape of the reflector 120 serves to collect light emitted by the light emitting area 114, i.e. the reflector 120 is shaped to redirect light emitted by the light emitting area 114 to provide a desired distribution of the light output from an automotive headlight in which the H7 bulb 110 is mounted, e.g. suitable for illuminating a road ahead of a vehicle. The light emitting area 114 may for example be arranged at, or close to, a focus of the reflector 120. While some light 131 emitted by the light emitting area 114 is reflected by the reflector 120, some light 132 emitted by the light emitting area 114 is emitted in directions away from the reflector 120 and exits the automotive headlight without being reflected by the reflector 120. Light 132 which exits the automotive headlight without being reflected by the reflector 120 may not contribute to the desired light output of the automotive headlight, e.g. may not contribute to illumination of the road.

Figure 2:
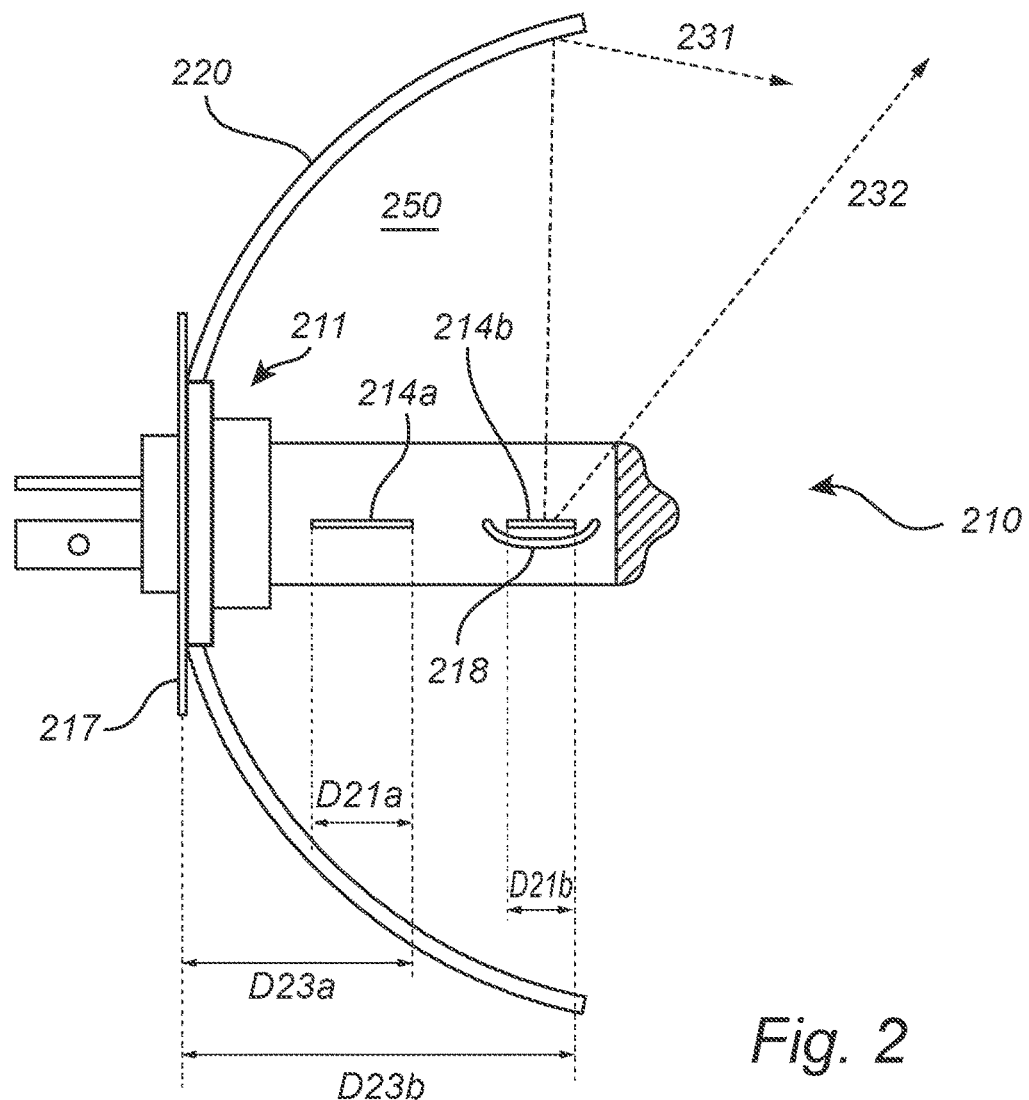
FIG. 2 is a schematic side view of an H4 replaceable headlight bulb mounted at an automotive headlight reflector.

FIG. 2 is a schematic side view of an H4 replaceable headlight bulb 210 mounted at an automotive headlight reflector 220 using a connector 211. Similarly to the reflector 120 described with reference to FIG. 1, the reflector 220 has a concave, e.g. parabolic, shape facing an interior volume 250. Similarly to the H7 bulb 110 described with reference to FIG. 1, a connector 211 of the H4 bulb 210 is mounted through a hole in the reflector 220 and the H4 bulb 210 extends from the connector 211 into the interior volume 250 such that a high beam light emitting area 214a, or high beam filament, and a low beam light emitting area 214b, or low beam filament, of the H4 bulb 210 are located in the interior volume 250. The light emitting areas 214a and 214b may for example be arranged after each other along a common axis.

The concave shape of the reflector 220 serves to collect light emitted by the light emitting areas 214a and 214b, i.e. the reflector 220 is shaped to redirect light emitted by the high beam light emitting area 214a and the low beam light emitting area 214b to provide a desired light output from an automotive headlight in which the H4 bulb 210 is mounted, e.g. suitable for illuminating a road ahead of a vehicle. A shutter 218 is arranged below the low beam light emitting area 214b. Light emitted by the low beam light emitting area 214b is prevented by the shutter 218 from reaching the lower half of the reflector 220, and light emitted by the low beam light emitting area 214b therefore mainly contributes to portions of the output of the automotive headlight directed downwards. Similarly to the H7 bulb 110 described with reference to FIG. 1, some light 231 emitted by the light emitting areas 214a and 214b of the H4 bulb 210 is reflected by the reflector 220, while some light 232 emitted by the light emitting areas 214a and 214b of the H4 bulb 210 exits the automotive headlight without being reflected by the reflector 220, and therefore does not contribute to the desired light output of the automotive headlight, e.g. does not contribute to illumination of the road.

Figure 3:
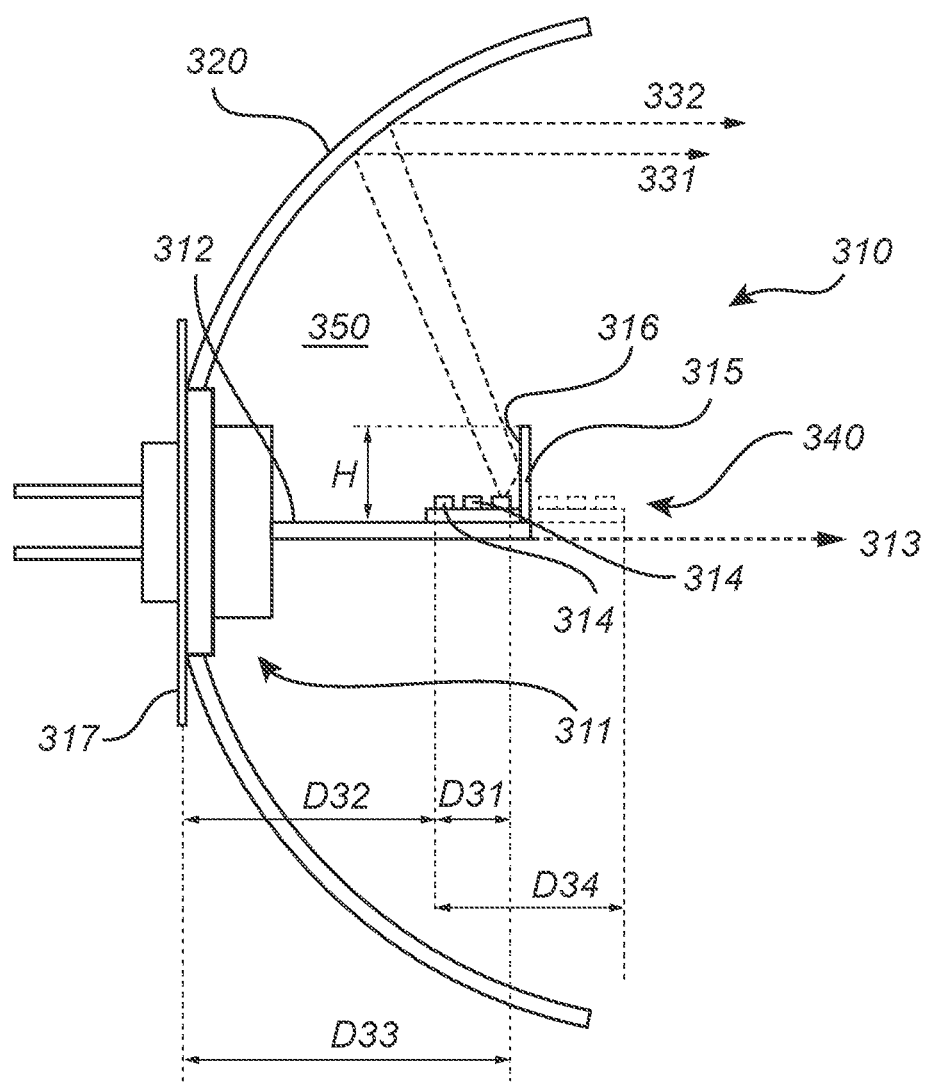
FIG. 3 is a schematic side view of a retrofit lamp for replacing the H7 replaceable headlight bulb shown in FIG. 1, according to an embodiment.

FIG. 3 is a schematic side view of a retrofit lamp 310 mounted at an automotive headlight reflector 320, according to some embodiments. The retrofit lamp 310 may be mountable at an automotive headlight adapted for connection of H7 replaceable headlight bulbs such that the retrofit lamp 310 can replace the H7 bulb 110 described with reference to FIG. 1. In other words, the H7 bulb 110 may serve as a reference replaceable headlight bulb on which the design of the retrofit lamp 320 may be based. Alternative embodiments may also be envisaged, in which the retrofit lamp 310 may be mounted at automotive headlights adapted for connection of other types of headlight bulbs, e.g. H1, H8, H9, H11, H13, H15 or H17 replaceable headlight bulbs; H4 two-filament replaceable headlight bulbs; HIR2 replaceable headlight bulbs; S2 two-filament incandescent headlight bulbs; HS1 two-filament replaceable headlight bulbs; HS5 two-filament replaceable headlight bulbs; 9002, 9003, 9004, 9005, 9006, or 9007 replaceable headlight bulbs; or D1, D2, D3, D4, D5, D6, D7 or D8 gas discharge headlight bulbs.

The retrofit lamp 310 comprises a connector 311, a body 312, a plurality of light emitting diodes (LEDs) 314 and a reflective element 315.

The connector 311 is adapted for mounting the lamp 310 at an automotive headlight and is exemplified herein by a connector 311 mounted through a hole in an automotive headlight reflector 320. The reflector 320 may for example have a concave, e.g. parabolic, surface facing an interior volume 350 and may be adapted to direct light emitted in the interior volume 350.

The body 312 extends from the connector 311 along an axis 313. The body 312 is exemplified herein by an elongated body 312 extending from the connector 311 into the interior volume 350 along an axis 313 which is transverse to the portion of the reflector 320 at which the connector 311 is mounted.

The LEDs 314 are arranged at the body 312. The LEDs 314 are arranged along the axis 313 and are adapted to emit light laterally with respect to the axis 313, i.e. the LEDs 314 are arranged at positions distributed along the axis 313 and are oriented such that they may emit light in directions transverse to, e.g. including a direction perpendicular to, the axis 313. For example, the LEDs 314 may be arranged to face directions transverse to, or e.g. perpendicular to, the axis 313. In some embodiments, light emitting surfaces of the respective LEDs 314 may for example be at least approximately parallel to the axis 313.

The arrangement of LEDs 314 is exemplified herein by a linear arrangement in the form of a row of LEDs 314 along the axis 313, wherein all the LEDs 314 are oriented in the same direction (e.g. upwards, as illustrated in FIG. 3). The row may include two or more LEDs 314 and is exemplified herein by a row of three LEDs 314. Other embodiments may also be envisaged in which the LEDs 314 may be non-linearly arranged along the axis 313, e.g. forming a two-dimensional pattern in a plane along the axis 313 or e.g. forming a three-dimensional pattern around and along the axis 313. Embodiments may be envisaged in which the individual LEDs 314 may be oriented differently relative to each other so as to emit light in different directions.

The reflective element 315 is arranged at an end of the arrangement of LEDs 314 opposite to the connector 311, i.e. at the end furthest away from the connector 311. The reflective element 315 is adapted to reflect some light emitted by the LEDs 314. The reflective element 315 is exemplified herein by a reflective element 315 having a reflective surface 316 which extends in at least a direction transverse to the axis 313 and which faces the LEDs 314. The reflective surface 316 may for example be located in a plane perpendicular to the axis 313 or may form an angle relative to the axis 313, i.e. a non-zero angle, e.g. in the range 70-110 degrees. The reflective surface 316 may be flat or may be curved. The reflective surface 316 may for example be convex or concave. The reflective surface 316 may for example slant towards the LEDs 314 or away from the LEDs 314. Both the shape of the reflective surface 316 and the angle which it forms relative to the axis 313 may affect the amount of light reflected by the reflective element 315, and/or the direction in which light is reflected, and may affect the light output of an automotive headlight at which the retrofit lamp 310 is arranged.

Without the reflective element 315, light 332 emitted by the LEDs 314 in a direction away from the connector 311 would exit the automotive headlight without being reflected by the reflector 320, similarly to some of the light 132 emitted by the light emitting area 114 of the H7 bulb 110 described with reference to FIG. 1. In the present embodiment, at least some light 332 emitted by the LEDs 314 in directions away from the connector 311 is reflected by the reflective element 315 towards the reflector 320, and may therefore contribute to the desired light output of the automotive headlight. Due to the presence of the reflective element 315 in the retrofit lamp 310, the retrofit lamp 310 may provide a light output of an automotive headlight which resembles the light output of an automotive headlight comprising a longer arrangement of LEDs than the arrangement of LEDs 314 in the retrofit lamp 310 described with reference to FIG. 3, i.e. the reflective element 315 causes a virtual prolongation 340 of the arrangement of LEDs 314 and the number of LEDs 314 employed may therefore be reduced. By reducing the number of LEDs 314, manufacturing costs for the retrofit lamp 310 may be reduced.

A reduction of the number of LEDs 314 reduces also the total lumen output of the arrangement of LEDs 314. Although the reflective element 315 may allow the light emitted by the LEDs 314 to be more efficiently employed, and may provide a virtual prolongation 340 of the arrangement of LEDs 314, the LEDs 314 employed may for example be chosen such that the lumen output of the individual LEDs 314 is increased to at least partially compensate for the reduction of the number of LEDs 314 employed. The width of the individual LEDs 314 may for example be increased to increase the lumen output. For example, in applications where a maximum allowed light emitting area width is 1.6 mm, LED dies of 1.4×1.4 iso 1.0 mm width may be employed.

The reflective element 315 may be arranged in (good) thermal contact with at least one of the LEDs 314 and may function as a heat sink for the LEDs 314. The reflective element 315 may for example be arranged in thermal contact with the LEDs 314 via the body (or base) 312. The body 312 may for example comprise metal parts or portions for conducting heat away from the LEDs 314.

The reflective element 315 may improve the cooling of the LEDs 314 and may thereby extend their lifetime, and/or may allow for use of LEDs 314 generating more heat. Moreover, if the reflective element 315 functions as a heat sink, the need for additional, e.g. external, heat sinks is reduced, which provides a more compact light source.

In the present embodiment, the reflective element 315 may have a height H, i.e. it may extend a distance H in a direction transverse to the axis 313, e.g. in a direction perpendicular to the axis 313. The height H may for example be at least half the extension D31 of the arrangement of LEDs 314 along the axis 313 and at most twice the extension D31 of the arrangement of LEDs 314 along the axis. For example, the height H of the reflective element 315 may coincide with the extension D31 of the arrangement of LEDs 314 along the axis 313. For example, the height H of the reflective element 315 may be shorter than the extension D31 of the arrangement of LEDs 314 along the axis 313. The height H of the reflective element 315 may for example be approximately half the length D11 of the light emitting area 114 of the H7 replaceable headlight bulb 110 described with reference to FIG. 1.

The connector 311 may for example comprise a portion 317 which is mountable (or adapted to be arranged) in a tangent plane of the reflector 320 when the lamp 310 is mounted at the automotive headlight. The portion 317 is exemplified herein by a portion of the connector 311 which is in abutment against the outside of the reflector 320 when the connector 311 is mounted at the reflector 320. A distance D32 from the portion 317 along the axis 313 to a LED 314 of the plurality of LEDs 314 arranged closest to the portion 317 (i.e. to the one of the LEDs 314 arranged closest to the portion 317) may coincide with a distance D12 from a corresponding portion 117 of a connector 111 of the H7 bulb 110 (described with reference to FIG. 1) to a light emitting area 114 of the H7 bulb 110. The distance D32 from the portion 317 along the axis 313 to a LED 314 of the plurality of LEDs 314 arranged closest to the portion 317 may for example be at most 25 mm.

The arrangement of LEDs 314 may for example extend a distance D31 along the axis 313 which is shorter than a length D11 of the light emitting area 114 of the H7 bulb 110 described with reference to FIG. 1, i.e. the row of LEDs 314 may be shorter than the light emitting area 114. For example, the row of LEDs 314 may be shorter than three fourths of the length D11 of the light emitting area 114. For example, the row of LEDs 314 may be shorter than 6 mm, or shorter than 3 mm. The virtual prolongation 340 of the arrangement of LEDs 314 by the reflective element 315 allows the arrangement of LEDs 314 to extend a shorter distance along the axis 313 than the light emitting area 114 it is adapted to replace. The combined distance D34 along the axis 313 covered by the arrangement of LEDs 314 and the virtual prolongation 340 may for example coincide with the length D11 of the light emitting area 114 of the H7 bulb 110.

The arrangement of LEDs 314 along the axis 313 may for example extend a distance D31 which is at least half the length D11 of the light emitting area 114 of the H7 bulb 110 described with reference to FIG. 1, i.e. the length D31 of the row of LEDs 314 may be at least half the length D11 of the light emitting area 114. For example, the arrangement of LEDs 314 may extend a distance D31 of at least 1.5 mm along the axis 313.

The reflective element 315 may be arranged at a certain distance D33 along the axis 313 from the portion 317 of the connector 311. This certain distance D33 may for example be smaller than a distance D13 from a corresponding portion 117 of the connector 111 of the H7 bulb 110, described with reference to FIG. 1, to a far end of the light emitting area 114 of the H7 bulb 110. This certain distance D33 may for example be smaller than 28 mm. In case the arrangement of LEDs 314 is instead adapted for replacing the low beam light emitting area 214b of the H4 bulb described with reference to FIG. 2, the certain distance D33 may for example be smaller than 32 mm.

The reflective element 315 is arranged at an end of the arrangement of LEDs 314. The reflective element 315 may for example be arranged adjacent the arrangement of LEDs 314, or close to the arrangement of LEDs 314. The reflective element 315 may for example be arranged at a distance of up to 2 mm from the arrangement of LEDs 314. The reflective element 315 may for example be mounted on the body 312. The body 312 may for example comprise a circuit board on which the LEDs 314 and the reflective element 315 are mounted.

An automotive headlight at which the retrofit lamp 310 is arranged may for example comprise the reflector 320 and the retrofit lamp 310. The retrofit lamp 310 may be mounted at the reflector 320 which may be adapted to reflect some light emitted by the LEDs 314. At least some of the LEDs 314 may for example be arranged at, or close to, a focus of the reflector 320 such that light emitted by the LEDs 314 may be more efficiently reflected by the reflector 320. The reflector 320 may have a concave, e.g. parabolic, shape.

The retrofit lamp 314 described with reference to FIG. 3 may for example comprise an enclosure (not shown in FIG. 3) covering the LEDs 314 and the reflective element 315. Although such an enclosure may affect the cooling of the LEDs 314, the enclosure may for example protect the LEDs 314.

The connector 311 may for example include electric connections for connecting the retrofit lamp 310 to a power supply.

The body 312 may for example include wires and/or other electric conductors for electrically connecting the LEDs 314 to the connector 311.

The LEDs 314 may for example be adapted to be oriented upwards when the retrofit lamp 310 is arranged at an automotive headlight. Since the light emitting area 114 of the H7 bulb 110, described with reference to FIG. 1, may emit light both upwards and downwards in an automotive headlight, a second row of LEDs (not shown in FIG. 3) may optionally be provided along the axis 313 on the lower side of the body 312 at a position corresponding to that of the light emitting area 114 of the H7 bulb 110, and may be adapted to emit light downwards when the retrofit lamp 310 is mounted at an automotive headlight. A second reflective element (not shown in FIG. 3) may for example be arranged at the second row of LEDs.

Figure 4:
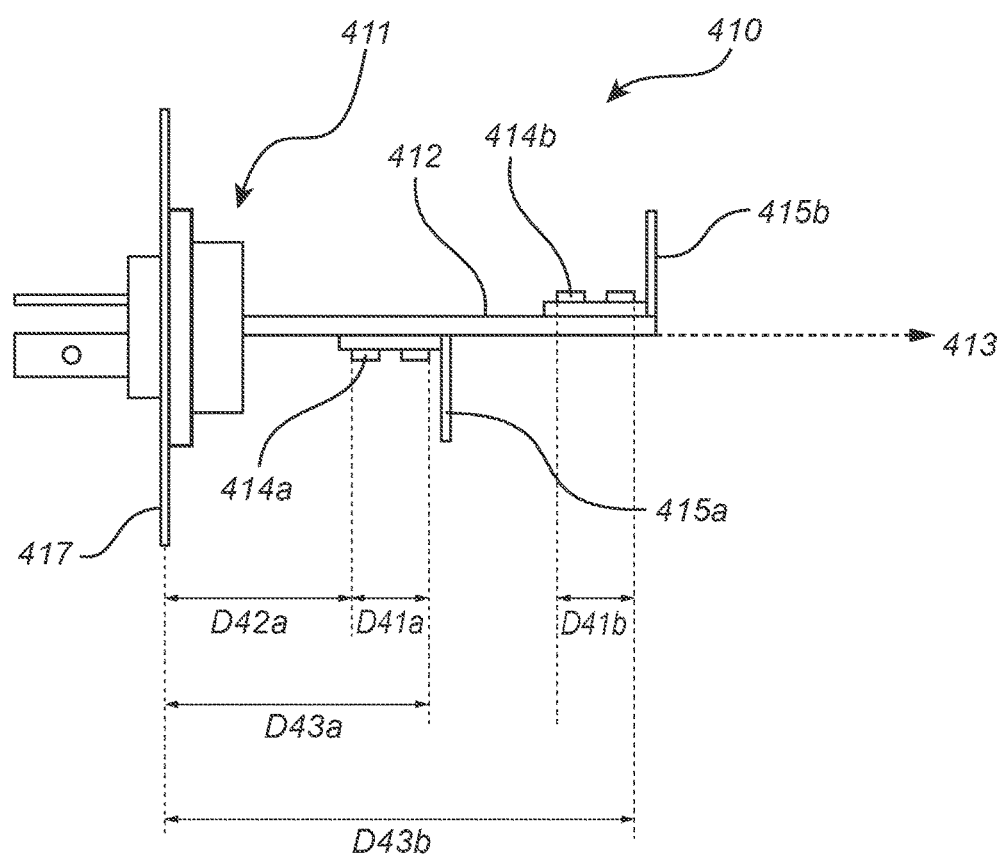
FIG. 4 is a schematic side view of a retrofit lamp for replacing the H4 replaceable headlight bulb shown in FIG. 2, according to another embodiment.

FIG. 4 is a schematic side view of a retrofit lamp 410, according to other embodiments. The retrofit lamp 410 may be mountable at an automotive headlight adapted for connection of H4 replaceable headlight bulbs such that it can replace the H4 replaceable headlight bulb 210 described with reference to FIG. 2. In other words, the H4 bulb 210 may serve as a reference replaceable headlight bulb on which the design of the retrofit lamp 420 may be based. While FIG. 3 depicts a retrofit lamp 310 mounted at a reflector 320, FIG. 4 depicts only the retrofit lamp 410 itself, i.e. it depicts the retrofit lamp 410 in a non-mounted state.

Similarly to the retrofit lamp 310 described with reference to FIG. 3, the retrofit lamp 410 comprises a connector 411, a body 412, a plurality of LEDs 414a, and a reflective element 415a. Unless specified otherwise, these parts of the retrofit lamp 410 may for example have the same features, properties and functions as the corresponding parts of the retrofit lamp 310 described with reference to FIG. 1.

For example, the connector 411 is adapted for mounting the lamp 410 at an automotive headlight. The body 412 extends from the connector 411 along an axis 413. The plurality of LEDs 414a is arranged at the body 412. The reflective element 415a is arranged at an end of the arrangement of LEDs 414a opposite to the connector 411.

Analogously to the LEDs 314 and the reflective element 315 of the retrofit lamp 310, described with reference to FIG. 3, the LEDs 414a and the reflective element 415a are adapted to provide, when the retrofit lamp 410 is mounted at an automotive headlight, a light output resembling the light output provided by the high beam light emitting area 214a of the H4 bulb 210, described with reference to FIG. 2.

The LEDs 414a may for example be adapted to be oriented downwards (i.e. the LEDs 414a may be adapted to emit light downwards) when the retrofit lamp 410 is mounted at an automotive headlight. As the high beam light emitting area 214a (of the H4 bulb 210 described with reference to FIG. 2) may for example emit light both upwards and downwards in an automotive headlight, a second row of LEDs (not shown in FIG. 4) may optionally be provided on the upper side of the body 412 at a position along the axis 413 corresponding to that of the first row of LEDs 414a (and of the high beam light emitting area 214a), and may be adapted to emit light upwards when the retrofit lamp 410 is mounted at an automotive headlight. A second reflective element (not shown in FIG. 4) may for example be arranged at the second row of LEDs.

The retrofit lamp 410 may comprise an additional plurality of LEDs (or group of LEDs) 414b and an additional reflective element 415b arranged at an end of the arrangement of the additional LEDs 414b opposite to the connector 411. The additional LEDs 414b and the additional reflective element 415b may be adapted to provide, when the retrofit lamp 410 is mounted at an automotive headlight, a light output resembling that of the low beam light emitting area 214b of the H4 replaceable headlight bulb 210 described with reference to FIG. 2.

Similarly to the plurality of LEDs 414a, the additional LEDs 414b may be arranged along the axis 413, and the additional LEDs 414b may be adapted to emit light laterally with respect to the axis 413. The additional reflective element 415b may be adapted to reflect some light emitted by the additional LEDs 414b.

The connector 411 may for example comprise a portion 417 which is adapted to be arranged in (or which is mountable in) a tangent plane of a reflector when the retrofit lamp 410 is mounted at an automotive headlight. The reflective element 415a may be arranged at a certain distance D43a from the portion 417 along the axis 413. The certain distance D43a may for example be smaller than a distance D23a from a corresponding portion 217 of the connector 211 of the H4 bulb 210 described with reference to FIG. 2 (which connector 211 is adapted for mounting the H4 bulb 210 at the reflector 210) to a far end of the high beam light emitting area 214a of the H4 bulb 210. The additional reflective element 415b may be arranged at another distance D43b from the portion 417 along the axis 413. This other distance D43b may for example be smaller than a distance D23b from a corresponding portion 217 of the connector 211 of the H4 bulb 210 described with reference to FIG. 2 (which connector 211 is adapted for mounting the H4 bulb 210 at the reflector 210) to a far end of the low beam light emitting area 214b of the H4 bulb 210.

In the present embodiment, the arrangements of LEDs 414a and 414b are exemplified by respective rows of two LEDs 414a and 414b. The respective distances D41a and D41b which these rows of LEDs 414a and 414b extend along the axis 413 may for example be shorter than, but at least half as long as, the lengths D21a and D21b of the high beam light emitting area 214a and low beam light emitting area 214b, respectively, of the H4 bulb 210 described with reference to FIG. 2. The positions of the rows of LEDs 414a and 414b along the axis 413 may for example coincide with the positions of the high beam light emitting area 214a and the low beam light emitting area 214b, respectively, in the H4 bulb 210.

In at least some embodiments, the arrangement of LEDs along the base of a retrofit lamp may be designed based on dimensions of corresponding light emitting areas of reference replaceable headlight bulbs. The light emitting area of a single-filament H7 bulb may for example have a length of 4 mm and a diameter of 1.3 mm. The low beam light emitting area of a two-filament H4 bulb may for example have a length of 5.3 mm and a diameter of 1.3 mm. The high beam light emitting area of a two-filament H4 bulb may for example have a length of 4 mm and a diameter of 1.3 mm. The light emitting area of a gas discharge type lamp may for example have an arc length of 4.2 mm and an arc diameter of 1.2 mm.

The person skilled in the art realizes that the present invention by no means is limited to the preferred embodiments described above. On the contrary, many modifications and variations are possible within the scope of the appended claims. For example, although retrofit lamps for providing light outputs resembling those of H4 and H7 bulbs have been described with reference to FIGS. 1-4, embodiments of retrofit lamps for providing light outputs resembling the light output of other headlight bulbs may also be envisaged. In such embodiments, the lengths and positions of the arrangement of LEDs may be selected based on the corresponding positions and sizes of light emitting areas of the respective headlight bulbs. Embodiments may also be envisaged in which retrofit lamps are adapted to be mounted at automotive headlights employing one or more lenses, rather than a headlight reflector, for shaping the light output of the automotive headlight. Further, although embodiments have been described in which the connector of a retrofit lamp may be mounted through a hole in a reflector, embodiments may also be envisaged in which the connector may be mounted at an edge of a reflector, and/or via dedicated fastening arrangements at the reflector, such as recesses and/or projections. The connector may for example comprise a geometry for mounting the retrofit lamp at an automotive headlight, e.g. including a snap fit design or threads for screwing the lamp in position.

Although embodiments have been described wherein light emitting areas are provided by filaments, other types of light sources may also be envisaged. A reference replaceable headlight bulb may for example be a gas discharge headlight bulb wherein the light emitting area is provided by an arc, instead of by a filament.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A retrofit lamp for replacing a reference replaceable headlight bulb within an automotive headlight, the automobile headlight having reflective surfaces that are designed for use with the reference replaceable headlight bulb having a filament with a first length, the retrofit lamp comprising:
   a connector for mounting the lamp at the automotive headlight;
   a body extending from the connector along an axis;
   a plurality of light emitting diodes arranged in at least one row at the body, wherein the light emitting diodes are arranged along the axis and adapted to emit light at least laterally with respect to the axis, the plurality of light emitting diodes extending a second length along the axis; and
   a reflective element arranged at an end of the arrangement of light emitting diodes opposite to the connector to reflect some light emitted by the light emitting diodes, the reflective element having an angle between 70-110 degrees relative to the axis, a height of the reflective element being between 0.5 to 2 times the second length of the plurality of light emitting diodes along the axis, and wherein
   the second length of the light emitting diodes along the axis is shorter than the first length of the filament in the reference replaceable headlight bulb, and
   the reflective element is configured to establish a virtual prolongation of the arrangement of the light emitting diodes to generally emulate a light pattern emitted by the filament of the reference replaceable headlight bulb for which the automobile headlight is designed.

2. The lamp of claim 1, wherein the light emitting diodes are arranged in a row along the axis.

3. The lamp of claim 1, wherein the reflective element has a reflective surface which is transverse to the axis.

4. The lamp of claim 1, wherein the reflective element extends in a direction transverse to the axis by at least half the second length of the light emitting diodes along the axis.

5. The lamp of claim 1, wherein the reflective element extends in a direction transverse to the axis by at most twice the second length of the light emitting diodes along the axis.

6. The lamp of claim 1, wherein the reflective element is arranged in thermal contact with at least one of the light emitting diodes.

7. The lamp of claim 1, wherein the connector comprises a portion mountable in a tangent plane of a reflector when the lamp is mounted at the automotive headlight, wherein a distance (D32) from said portion along the axis to a light emitting diode of said plurality of light emitting diodes arranged closest to said portion coincides with a distance (D12) from a corresponding portion of a connector of the reference replaceable headlight bulb to the filament of the reference replaceable headlight bulb.

8. The lamp of claim 1, wherein the second length is less than three fourths of the first length.

9. The lamp of claim 1, wherein the second length is at least half of the first length.

10. The lamp of claim 1, wherein the reference replaceable headlight bulb is:
- a H1, H7, H8, H9, H11, H13, H15 or H17 replaceable headlight bulb;
- a H4 two-filament replaceable headlight bulb;
- a HIR2 replaceable headlight bulb;
- a S2 two-filament incandescent headlight bulb;
- a HS1 two-filament replaceable headlight bulb;
- a HS5 two-filament replaceable headlight bulb; or
- 9002, 9003, 9004, 9005, 9006, or 9007 replaceable headlight bulb.

11. The lamp of claim 1, wherein the connector comprises a portion mountable in a tangent plane of a reflector when the lamp is mounted at the automotive headlight, wherein the reflective element is arranged at a distance (D33) from said portion along the axis, said distance being smaller than:
- a distance (D23a) from a corresponding portion of a connector of a reference two-filament replaceable headlight bulb to a far end of a high beam light emitting area of the reference two-filament replaceable headlight bulb; or
- a distance (D13) from a corresponding portion of a connector of a reference single-filament replaceable headlight bulb to a far end of a light emitting area of the reference single-filament replaceable headlight bulb.

12. The lamp of claim 1, wherein the lamp is mountable at an automotive headlight for:
- a H1, H7, H8, H9, H11, H13, H15 or H17 replaceable headlight bulb;
- a H4 two-filament replaceable headlight bulb;
- a HIR2 replaceable headlight bulb;
- a S2 two-filament incandescent headlight bulb;
- a HS1 two-filament replaceable headlight bulb;
- a HS5 two-filament replaceable headlight bulb; or
- 9002, 9003, 9004, 9005, 9006, or 9007 replaceable headlight bulb.

13. An automotive headlight comprising:
an automotive headlight reflector; and
a retrofit lamp as defined in claim 1,
wherein the retrofit lamp is mounted at the reflector and the reflector is adapted to reflect some light-emitted by the light emitting diodes.

* * * * *